(12) United States Patent
Werlang

(10) Patent No.: US 11,357,229 B2
(45) Date of Patent: Jun. 14, 2022

(54) COMPOSITION, USES AND PREPARATION PROCESS THEREOF, AS WELL AS METHOD TO ENSURE HIGH CORN CROP YIELD

(75) Inventor: Ricardo Camera Werlang, Goiania (BR)

(73) Assignee: FMC Quimica do Brasil, Sao Paulo (BR)

( * ) Notice: Subject to any disclaimer, the term of this patent is extended or adjusted under 35 U.S.C. 154(b) by 1562 days.

(21) Appl. No.: 14/240,825

(22) PCT Filed: Aug. 8, 2012

(86) PCT No.: PCT/BR2012/000277
§ 371 (c)(1),
(2), (4) Date: May 30, 2014

(87) PCT Pub. No.: WO2013/026114
PCT Pub. Date: Feb. 28, 2013

(65) Prior Publication Data
US 2014/0302992 A1    Oct. 9, 2014

(30) Foreign Application Priority Data

Aug. 25, 2011  (BR) ............................. PI 1104162-5

(51) Int. Cl.
| | |
|---|---|
| *A01N 53/00* | (2006.01) |
| *A01N 33/12* | (2006.01) |
| *A01N 43/82* | (2006.01) |
| *A01N 27/00* | (2006.01) |
| *A01N 57/20* | (2006.01) |
| *A01N 43/54* | (2006.01) |
| *A01N 43/56* | (2006.01) |
| *A01N 43/653* | (2006.01) |
| *A01N 47/24* | (2006.01) |

(52) U.S. Cl.
CPC ............. *A01N 33/12* (2013.01); *A01N 27/00* (2013.01); *A01N 43/54* (2013.01); *A01N 43/56* (2013.01); *A01N 43/653* (2013.01); *A01N 43/82* (2013.01); *A01N 47/24* (2013.01); *A01N 53/00* (2013.01); *A01N 57/20* (2013.01)

(58) Field of Classification Search
CPC ........ A01N 27/00; A01N 53/00; A01N 33/12; A01N 43/54; A01N 43/56; A01N 43/653; A01N 43/82; A01N 47/24; A01N 57/20
See application file for complete search history.

(56) References Cited

U.S. PATENT DOCUMENTS

| | | | | |
|---|---|---|---|---|
| 4,361,436 A | * | 11/1982 | McCarthy | A01N 57/20 504/128 |
| 8,232,228 B2 | | 7/2012 | Wei | |
| 2007/0149401 A1 | | 6/2007 | Haskell et al. | |
| 2009/0062124 A1 | | 3/2009 | Burke | |
| 2011/0053773 A1 | | 3/2011 | Armel et al. | |
| 2012/0128648 A1 | | 5/2012 | Kaushik | |

FOREIGN PATENT DOCUMENTS

| | | | |
|---|---|---|---|
| CN | 1252940 A | | 5/2000 |
| CN | 1278611 C | * | 10/2006 |
| CN | 101011063 A | * | 8/2007 |
| CN | 100464638 C | * | 3/2009 |
| CN | 100464638 C | * | 3/2009 |
| CN | 101697734 A | | 4/2010 |
| CN | 101999401 A | | 4/2011 |
| CN | 102060602 A | | 5/2011 |
| EP | 0022666 A1 | * | 1/1981 |
| WO | WO 81/00187 A1 | * | 2/1981 |
| WO | WO 2004/057957 A2 | | 7/2004 |
| WO | WO 2008/020872 A2 | | 2/2008 |
| WO | WO 2009/029661 A1 | | 3/2009 |
| WO | WO 2011/013133 A2 | | 2/2011 |
| WO | WO 2011/028987 A2 | | 3/2011 |

OTHER PUBLICATIONS

Gaska & Oplinger "Use of Ethephon as a Plant Growth Regulator in Corn Production" Crop Sci. 28: pp. 981-986 (1988) XP009183389.
Butzen S., Optimizing Seeding Rates of r Corn Production (Crop Insights)? [online] www.pioneer.com/home/site/us/agronomy/library/template, 5 pages, Jul. 22, 2015.
Extended European Search Report for corresponding European Application No. 12825579.1 dated Apr. 8, 2015, 9 pages.
International Search Report and Written Opinion for International Application No. PCT/BR2012/000277, dated Oct. 2, 2012.
International Preliminary Report on Patentability, Chapter II for International Application No. PCT/BR2012/000277 dated Oct. 22, 2013.

(Continued)

*Primary Examiner* — Sue X Liu
*Assistant Examiner* — Mei Ping Chui
(74) *Attorney, Agent, or Firm* — Kevin S. Dobson; FMC Quimica do Brasil

(57) ABSTRACT

The present invention relates to a composition comprising a plant growth regulator and/or fungicide and/or insecticide and/or acaricide and the preparation process thereof. Additionally, the present invention discloses the use of a plant growth regulator and/or fungicide and/or insecticide and/or acaricide to prepare a composition and the use of a composition to ensure high yield per area of a corn crop. Furthermore, the present invention provides methods to reduce excessive growth of corn plants, to strengthen stems, the root system and adventitious roots of corn plants, to combat diseases and pests and to confer resistance to pest control, as well as a method to identify a composition that ensures high corn crop yield.

7 Claims, No Drawings

(56) References Cited

OTHER PUBLICATIONS

Ransom et al XP055538602 "Corn Growth and Management Quick Guide" NDSU Extension A1173 Revised May 2020, pp. 1-8, online at www.ndsu.edu/Extension.
Khosravi et al XP009510261 "Growth, Yield and Yield Components of Ethephon-treated Corn" Dept of Agronomy, Iowa State Univ., Ames IA, May 8, 1990 Plant Growth Regulation, 10: p. 27-36.
Shekoofa et al. XP55624957 "Plant Growth Regulator (Ethephon) Alters Maize Growth, Water Use and Grain Yield Under Water Stress" Journal of Agronomy 7(1): p. 41-48, 2008, ANSInet.

\* cited by examiner

COMPOSITION, USES AND PREPARATION PROCESS THEREOF, AS WELL AS METHOD TO ENSURE HIGH CORN CROP YIELD

FIELD OF THE INVENTION

The present invention relates to a composition comprising a plant growth regulator and/or fungicide and/or insecticide and/or acaricide and its preparation process.

Particularly, the present invention describes the use of a plant growth regulator and/or fungicide and/or insecticide and/or acaricide to prepare a composition and the use of a composition to ensure high yield per area of a corn crop. Furthermore, the present invention describes methods to reduce excessive growth of corn plants, to strengthen stems, the root system and adventitious roots of corn plants, to combat diseases and pests, to confer resistance to pest combat, as well as a method to identify a composition that ensures high crop yield, particularly in corn crops.

BACKGROUND OF THE INVENTION

It is known that to achieve high yield in corn crops the occurrence of two situations is extremely important: the first one is the high yield per corn plant achieved by genetic improvement of the corn plants and the use of high technology in the yield system, such as high rates of fertilization and cultural practices appropriate to the expected yield level; the other situation is the use of high density (number of corn plants per hectare of corn). Although scientific experts in the field have found that the ideal density for high yield would be with seeding densities higher than 100,000 corn plants per hectare, however, it is very difficult to achieve such density, since corn plants tend to grow too much in their search for light and, as a result, they break and fall, with significant loss in yield.

Corn is a plant of the Gramineae family and the *Zea mays* species, being a plant of commercial interest since it is widely used as human food and animal feed because of its nutritional qualities. Thus, the search for improvements in corn cultivation with a view to circumventing basic problems, such as reduced interference by pests in the aerial parts, such as caterpillars (*Spodoptera* sp., *Pseudaletia* sp., *Helicoverpa* sp., *Diatraea* sp.), aphids, mites, bug; reduced interference by diseases in the aerial parts, such as: spot blotch (*Exerohilum turcicum*), white leaf spot or phaeosphaeria leaf spot (*Phaeosphaeria maydis*); *Diplodia* spot (*Diplodia macrospora*); *Cercospora* leaf spot (*Cercospora zeamaydis*); Anthracnose (*Colletotrichum graminicola*); Polissora rust (*Puccinia polysora*); tropical rust (*Physopella zeae*); common rust (*Puccinia sorghi*), and maintaining high yield is an object of the present invention.

The current corn yield system uses planting densities that provide higher profitability per area between 50,000 and 70,000 plants per hectare. Under these conditions the plants provide their maximum potential yield. However, a high density of plants per hectare represents a loss of ventilation in the cornfields, less sunlight and formation of microclimate with higher humidity which, in turn, provides a perfect environment for the development of diseases that usually do not affect corn crops.

The solution to such problems related to corn crops would be to limit plant growth through the use of plant growth regulators, commonly used in other crops (cotton, wheat), but without any tradition in corn crop in order to provide the cultivation of high densities of corn plants per hectare with a view to achieving considerable increase in the crop's yield potential, as well as to improving pest and disease control in the crop. The inventors of the present invention have found that applications of a growth regulator, for example, ethephon, in the late vegetative stage of corn (V6-V9), successfully limit the growth of corn plants, resulting in plants 15% to 25% smaller than normal, without any impact to the plant's health. Additionally, the plants treated with a growth regulator, for example, ethephon, developed a stronger root system, which is an additional prevention against the constant breakage of corn plants stems and falling of the plants.

The present invention consists of using the effect of a growth regulator in corn crops to enable cultivation in high planting densities (densities greater than 100,000 plants per hectare), thus, considerably raising the potential yield of the corn crop.

Document WO 2004057957 relates to methods for increasing the efficacy of common agrochemicals, wherein said agrochemicals are applied to plants and plant seeds, controlling pests, such as insects, fungi, diseases and weeds, and reducing, thus, the loss of yield.

Another prior art document, WO 2008020872 is directed to compositions and methods for suppressing bacterial diseases by manipulating plant germination and growth.

Document WO 2011013133 describes the isolation and characterization of novel biopesticide compositions obtained from *Eucalyptus* species acting as effective biocontrol agents, while document WO 2011028987 provides methods for the direct or indirect improvement in the levels of phytonutrients and/or stress tolerance in plants, such improvement provided by the application of defoliants, insecticides, nematicides, herbicides, among others.

The plant growth regulator, ethephon, has been previously studied and reported in the prior art as a growth regulator in corn crops. However, the present invention consists in the interaction of the growth regulator in a differentiated cropping system. Such technologies applied alone do not provide the enhanced effect on crop yield, i.e., both the application of the growth regulator to the current system of corn cultivation and the cultivation of corn with high density without the use of the growth regulator did not provide a differential in yield.

The corn crop system with a high density of plants per hectare provides conditions that favor the development of diseases. The corn crops need protection from weeds, pests and diseases to produce better crops and better grain quality. Thus, the present invention provides better conditions for reduced interference by pests in the aerial parts of plants, such as caterpillars (*Spodoptera* sp., *Pseudaletia* sp., *Helicoverpa* sp., *Diatraea* sp.), aphids, mites, bugs; reduced interference by diseases in the aerial parts, such as spot blotch (*Exerohilum turcicum*), white leaf spot or phaeosphaeria leaf spot (*Phaeosphaeria maydis*); *Diplodia* spot (*Diplodia macrospora*); *Cercospora* leaf spot (*Cercospora zeamaydis*); Anthracnose (*Colletotrichum graminicola*); Polissora rust (*Puccinia polysora*); tropical rust (*Physopella zeae*); common rust (*Puccinia sorghi*). The present invention also allows lower water loss from evapotranspiration of corn crop leaves, since it reduces the leaf area of the culture, and primarily by reducing the size of the corn crop.

The present invention consists in the use of plant growth regulators, such as: ethephon (2-chloroethylphosphonic acid), mepiquat chloride, Ca-prohexadione, ancymidol, flurprimidol, chlormequat, dikegulac sodium, mefluidide, uniconazole, paclobutazole, 1-naphthaleneacetic acid (NAA), 1-naphthalene acetamide, carbaryl, 6-benzyladenine (6BA), etichlozate, sulphocarbamide, ethylene, gibberellic acid (GA3), GA47, choline chloride, benzyladenine, cyanamide, cynetine, acybenzolar-S-methyl, together with fungicides and/or insecticides and/or acaricides, ensuring an excellent corn crop yield while maintaining the quality of the plants.

SUMMARY OF THE INVENTION

The present invention relates to a composition comprising a plant growth regulator and/or fungicide and/or insecticide and/or acaricide and the preparation process thereof.

Particularly, the present invention describes the use of a plant growth regulator and fungicide and/or insecticide and/or acaricide to prepare a composition and the use of a composition to ensure high yield per area of a corn crop.

Furthermore, the present invention describes methods to reduce the excessive growth of corn plants, to strengthen stems, the root system and adventitious roots of corn plants, to combat diseases and pests and to confer resistance to diseases and pest combat, as well as a method to identify a composition that ensures high yield in corn crops.

The advantage of the present invention consists of using a plant growth regulator to provide a crop of corn in higher planting densities, while ensuring high yield.

DETAILED DESCRIPTION OF THE INVENTION

As mentioned above, the present invention consists of using a growth regulator together with fungicide and/or insecticide and/or acaricide to provide a corn crop in higher planting densities. In this sense, the cultivation of corn is made with densities greater than 100,000 plants per hectare. For these plants have condition to express their yield potential, even when subjected to a high density per area, it is necessary to apply a growth regulator in the culture's development stage V6-V9. After said growth regulator is applied, the plant stops growing, it initiates the formation of adventitious roots, promotes greater stiffness of the stem and continues its normal reproductive development.

The term "plant growth regulator" herein refers to natural or synthetic chemical compounds that, when applied, regulate or alter the growth of a plant or part of a plant.

The term "fungicide" herein refers to chemical compounds that eliminate or inhibit fungi growth, reproduction and/or infestation in plants.

The term "insecticide" herein refers to chemical compounds that eliminate or inhibit insect growth, reproduction and/or infestation in plants.

The term "acaricide" herein refers to chemical compounds that eliminate or inhibit mite growth, reproduction and/or infestation in plants.

The interaction between a plant growth regulator and/or a fungicide and/or an insecticide and/or an acaricide promotes the reduction of growth in the aerial parts of the corn, the strengthening of the stems (branching), the development of the root system, the development of adventitious roots, among others, providing better corn plant health and enabling proper conditions for obtaining high yield.

The present invention further relates to a composition comprising a plant growth regulator and/or fungicide and/or insecticide and/or acaricide.

The plant growth regulator, according to the present invention, is selected from the group consisting of ethephon (2-chloroethylphosphonic acid), mepiquat chloride, Ca-prohexadione, ancymidol, flurprimidol, chlormequat, dikegulac sodium, mefluidide, uniconazole, paclobutazole, 1-naphthaleneacetic acid (NAA), 1-naphthalene acetamide, carbaryl, 6-benzyladenine (6BA), etichlozate, sulphocarbamide, ethylene, gibberellic acid (GA3), GA47, choline chloride, benzyladenine, cyanamide, cynetine, acybenzolar-S-methyl.

The fungicides according to the present invention comprise different groups, namely: triazoles (the examples include, but are not limited to azaconazole, bitertanol, bromuconazole, cyproconazole, difenoconazole, diniconazole, epoxyconazole, ethaconazole, fenbuconazole, fluquinconazole, flusilazole, flutriafole, hexaconazole, imibenconazole, ipconazole, metconazole, myclobutanil, penconazole, propiconazole, protioconazole, simeconazole, tebuconazole, tetraconazole, triadimefon, triadimenol, triticonazole), strobirulins (examples include, but are not limited to azoxystrobin, enestrobin, picoxystrobin, piraoxystrobin, pyraclostrobin, pyrametostrobin, kresoxim-methyl, trifloxystrobin, dimoxystrobin, metominostrobin, orysastrobin, famoxadone, fluoxastrobin, fenamidone, pyribencarb), benzimidazoles (examples include, but are not limited to benomyl, carbendazim, fuberidazole, thiabendazole, thiophanate, thiophanate-methyl), acylanilides (examples include, but are not limited to benalaxyl, furalaxyl, metalaxyl, metalaxyl-M, mefenoxam), benzamides (examples include, but are not limited to benodanil, fluopiram, flutolanil, mepronil), carboxanilides (examples include, but are not limited to fenfuram, carboxin, oxycarboxin, thifluzamide, bixafen, furametpyr, isopyrazam, penflufen, penthiopyrad, sedaxane, boscalid), pyrazoles (examples include, but are not limited to fipronil, etiprole), *Bacillus subtilis* and the fungicidal lipopeptides produced (examples include, but are not limited to *Bacillus subtilis, Bacillus pumilus*), dithiocarbamates and derivatives (examples include, but are not limited to ferbam, mancozeb, maneb, metiram, propineb, tiram, zineb, ziram), phthalimides (examples include, but are not limited to captan, captafol, folpet), chloronitriles (phthalonitriles) (examples include, but are not limited to chlorothalonil) and inorganics (examples include, but are not limited to copper, sulfur).

More preferably, the fungicides according to the present invention consist of: triazoles, strobilurins and carboxanilides.

The insecticides according to the present invention comprise different groups, namely: anthranilamide (examples include, but are not limited to chlorantraniliprole and cyantraniliprole), phthalic acid diamide (examples include, but are not limited to flubendiamide), pyrazole analog (examples include, but are not limited to chlorphenapyr), avermectins (examples include, but are not limited to abamectin), benzoylurea (examples include, but are not limited to chlorfluazuron, diflubenzuron, flufenoxuron, lufenuron, novaluron, teflubenzuron, triflumuron), biological agents (examples include, but are not limited to *Bacillus thuringiensis, Baculovirus anticarsia, Metarhizium anisopliae*), bis (thiocarbamate) (cartap hydrochloride), ketoenol (examples include, but are not limited to spiromesifen, spirodiclofen, spirotetramat), chloro-cyclodiene (examples include, but are not limited to endosulfan), spinosyns (examples include, but are not limited to espinosade), pyridyloxypropyl ether (examples include, but are not limited to pyriproxyfen), phenylpyrazole (examples include, but are not limited to ethiprole), phenylthiourea (examples include, but are not limited to diafenthiuron), carbamates (examples include, but are not limited to benfuracarb, carbofuran, carbosulfan, furathiocarb, alanycarb, aldicarb, methomyl, thiodicarb), neonicotinoid (examples include, but are not limited to acetamiprid, clothianidin, imidacloprid, thiacloprid, thiamethoxam, clothianidin), nicotinoid (examples include, but are not limited to flonicamid), organophosphorous (examples include, but are not limited to acephate, cadusafos, chlorpyrifos, diazinon, dimethoate, disulfoton, ethione, fenitrothion, fenthion, phenthoate, phorate, phosmet, fosthiazate, malathion, methamidophos, methidathion, mevinphos, parathion-methyl, pyridaphenthion, pirimiphos-methyl, profenophos, prothiophos, tebupirimphos, terbuphos, triazophos, trichlorphon), oxadiazine (examples include, but are not limited to indoxacarb), pyrazole (examples include, but are not limited to fipronil), pyrethroid (examples include, but are not limited to alpha-cypermethrin, beta-cyfluthrin, beta-cypermethrin, bifenthrin, cyfluthrin, cypermethrin, deltamethrin, esfenvalerate, fenpropathrin, fluvalinate, gamma-cyhalothrin, lambda-cyhalothrin, permethrin, zeta-cypermethrin).

More preferably, the insecticides according to the present invention consist of: neonicotinoids, carbamates and pyrethroids.

The acaricides according to the present invention comprise different groups, namely: avermectins (examples include, but are not limited to abamectin), bis(arylformamidine) (examples include, but are not limited to amitraz), ketoenol (examples include, but are not limited to spirodiclofen, spirotetramat, spiromesifen), chlorodiphenyl sulfone (examples include, but are not limited to tetradifon), diacylhydrazine (examples include, but are not limited to chromafenozide), diphenyl oxazoline (examples include, but are not limited to ethoxazole), dinitrophenol (examples include, but are not limited to dinocap), phenylthiourea (examples include, but are not limited to diafenthiuron), oxazolidinedione (examples include, but are not limited to famoxadone), pyrazole (examples include, but are not limited to fenpyroxymate), pyridazinone (examples include, but are not limited to pyridaben), alkyl sulphite (examples include, but are not limited to propargite), tetrazine (examples include, but are not limited to clofentezine), thiadiazinone (examples include, but are not limited to buprofezin) thiazolidine carboxamide (examples include, but are not limited to hexythiazox).

More preferably, the acaricides according to the present invention consist of: avermectins, phenylthiourea and ketoenol.

These fungicides, insecticides and acaricides are provided only as examples. There are alternative names and classifications for the cited active ingredients that would also be covered in the scope of protection of the present invention.

The plant growth regulator according to the present invention can be applied in an amount ranging from about 1 to about 1000 g a.i./ha, more preferably, from about 2.5 to about 500 g a.i./ha.

The plant growth regulator is used with fungicide and/or insecticide and/or acaricide, which is present in an amount ranging from about 10 to about 500 g/L or g/kg of formulated product, more preferably, from about 20 to about 400 g/L or g/kg of formulated product.

The plant crops according to the present invention include conventional corn, transgenic corn, mutagenic corn, modified corn, sweet corn and popcorn, in which the corn plants are grown at a density greater than or equal to 100,000 plants per hectare.

In a preferred embodiment, the present invention relates also to the use of a plant growth regulator and/or fungicide and/or insecticide and/or acaricide to prepare a composition, as well as to the use of a composition to ensure high yield per area of a corn crop, together with the control of diseases and parasites (pests) that affect corn crops.

The parasites (pests) according to the present invention are selected from the group consisting of caterpillars (*Spodoptera frugiperda, Spodoptera latifacea, Spodoptera eridanea, Spodoptera* sp.), leafworms (*Mocis latipes*), leafhoppers (*Deois flavopicta*), corn planthoppers (*Peregrinus maidis* and *Dalbulus maidis*), corn aphids (*Rhopalosiphum maidis*), sugarcane borer (*Diatraea saccharalis*), corn earworms (*Helicoverpa zea*), pentatomid bugs (*Dichelops melacanthus* and *Dichelops furcatus*), neotropical brown stinkbugs (*Euschistus heros, Nezara viridula, Piezodorus guildine*), leaffooted bugs (*Leptoglossus zonatus*), squash bug (*Phthia picta*), armyworms (*Pseudaletia* sp.) and mites.

The diseases caused by parasites according to the present invention are selected from the group consisting of spot blotch (*Exerohilum turcicum*), white leaf spot or phaeosphaeria leaf spot (*Phaeosphaeria maydis*); diplodia spot (*Diplodia macrospora*), cercospora leaf spot (*Cercospora zeamaydis*), anthracnose (*Colletotrichum graminicola*), polissora rust (*Puccinia polysora*), tropical rust (*Physopella zeae*) and common rust (*Puccinia sorghi*).

These parasites are provided only as examples. There are alternative names and classifications for the cited parasites that are equally encompassed in the scope of protection of the present invention.

Furthermore, the present invention relates to methods to reduce excessive growth of corn plants, to strengthen stems, root system and adventitious roots of corn plants, comprising the application of an agronomically effective amount of a composition comprising a plant growth regulator and/or fungicide and/or insecticide and/or acaricide, to the plant, its habitat, progeny and/or propagation material.

Still, a method is provided for combating pests, in which an agronomically effective amount of a composition is allowed to act in said pests and/or their habitat.

A method is provided to confer resistance to pest control in a corn crop, comprising the application of an agronomically effective amount of a composition to the corn crop, wherein the pests are selected from the group consisting of caterpillars (*Spodoptera frugiperda, Spodoptera latifacea, Spodoptera eridanea, Spodoptera* sp.), leafworms (*Mocis latipes*), leafhoppers (*Deois flavopicta*), corn planthoppers (*Peregrinus maidis* and *Dalbulus maidis*), corn aphids (*Rhopalosiphum maidis*), sugarcane borer (*Diatraea saccharalis*), corn earworms (*Helicoverpa zea*), pentatomid bugs (*Dichelops melacanthus* and *Dichelops furcatus*), neotropical brown stinkbugs (*Euschistus heros, Nezara viridula, Piezodorus guildine*), leaffooted bugs (*Leptoglossus zonatus*), squash bugs (*Phthia picta*), armyworms (*Pseudaletia* sp.) and mites.

The present invention also discloses a method for identifying a composition that ensures high yield of corn crops, comprising the steps of:

a) applying an agronomically effective amount of a candidate composition to one or more plants;

b) sprouting said one or more plants;

c) comparing the growth rate of said plants with the growth rate of untreated plants; and d) identifying the candidate composition as a composition that ensures high yield in corn crops and that additionally ensures control of diseases caused by parasites that attack corn plants, wherein said candidate composition comprises a plant growth regulator and a fungicide, a plant growth regulator and more than one type of fungicide, a plant growth regulator and an insecticide, a plant growth regulator and more than one type of insecticide, a regulator and an insecticide and a fungicide, and wherein said high yield is related to a reduction of the excessive growth of corn plants, strengthening of the stems of corn plants, strengthening of the corn plant root system.

The candidate composition can be applied at a rate of 1 to 2000 g a.i./ha, more preferably 2.5 to 1000 g a.i./ha.

In another embodiment, the present invention relates to a process for preparing a composition comprising combining agronomically effective amounts of a plant growth regulator and/or fungicide and/or insecticide and/or acaricide and, later, properly mixing them with carriers, adjuvants and/or excipients thereof. In this sense, the plant growth regulator may be ethephon, mepiquat chloride, Ca-prohexadione, ancymidol, flurprimidol, chlormequat, dikegulac sodium, mefluidide, uniconazole, paclobutazole, 1-naphthaleneacetic acid (NAA), 1-naphthalene acetamide, carbaryl, 6-benzyladenine (6BA), etichlozate, sulphocarbamide, ethylene, gibberellic acid (GA3), GA47, choline chloride, benzyladenine, cyanamide, cynetine or acybenzolar-S-methyl, and the fungicide is selected from the group consisting of triazoles, strobilurins, benzimidazoles, anilides, carboxanilides, benzamides, pyridines and pyrazoles. The insecticides are selected from the group consisting of anthranilamide, phthalic acid diamide, pyrazole analogs, avermectins, benzoylurea, biological agents, bis(thiocarbamate), ketoenol, chloro-cyclodiene, spinosyns, pyridyloxypropyl ether, phenylpyrazole, phenylthiourea, carbamates, neonicotinoids, nicotinoids, organophosphorous, oxadiazine, pyrazole, pyrethroid, and the acaricides are selected from the group consisting of avermectins, bis(arylformamidine), ketoenol, chlorodiphenylsulfone, diacylhydrazine, diphenyl oxazolin, dinitrophenol, phenylthiourea, oxazolidinadione, pyrazole, pyridazinone, alkyl sulphide, tetrazine, thiadiazinone, thiazolidine carboxamide. The carriers, adjuvants and/or excipients are selected from the group consisting of mineral oil, vegetable oil, silicone adjuvants, non-silicone adjuvants, methyl ester of soybean oil, nonylphenol ethoxylate, ethoxylated alkyl ester of phosphoric acid, mixture of paraffin hydrocarbons, cyclic paraffins and saturated and unsaturated aromatics.

The illustrative examples presented below will serve to better describe the present invention. However, the data and procedures used as examples merely relate to some embodiments of the present invention and shall not be considered to be limiting the scope thereof.

Example 1—Effect of Growth Regulator Ethephon Applied to Corn at the Stage of Development V8

In the moment of the application, the insecticide methomyl (215 g ha$^{-1}$ a.i.) and the fungicide pyraclostrobin+epoxyconazole (99.75+37.5 g ha$^{-1}$ a.i.) were added in all treatments, including the control.

The application of ethephon to corn at the stage of development V8 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.6 cm while the treatments with the application of ethephon had shoot length less than or equal to 159.1 cm (Table 1).

The application of ethephon reduces the length and diameter of ears of corn and the yield reduction was not significant (Table 1). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of ethephon would provide yield increases of more than 39% when compared to the control without application at the normal density of sowing (Table 2).

TABLE 1

Average results in shoot length (height), ear length and diameter and corn yield in function of the treatments.
Nova Mutum - Mato Grosso state - Brazil.

| | | Dose | | 30 DAA | | | | | | | |
|---|---|---|---|---|---|---|---|---|---|---|---|
| | Treatment | g ha$^{-1}$ a.i. | CP L ha$^{-1}$ | Height (cm) | | Ear Length (cm) | | Ear Diameter (mm) | | Yield kg/ha | |
| 1 | Control | | | 233.6 | a | 27.9 | a | 54.6 | a | 5075.6 | a |
| 2 | Ethephon | 216 | 0.3 | 157.3 | c | 25.8 | c | 50.4 | a | 4335.6 | a |
| 3 | Ethephon | 360 | 0.5 | 153.9 | c | 25.6 | c | 51.6 | cd | 4253.3 | a |
| 4 | Ethephon | 576 | 0.8 | 152.2 | c | 25.4 | c | 50.7 | cd | 4680.0 | a |
| 5 | Acybenzolar-S-methyl | 5 | 0.01 | 206.8 | b | 26.5 | bc | 53.7 | ab | 4815.6 | a |
| 6 | Dietholate | 100 | 0.125 | 234.0 | a | 27.6 | ab | 52.3 | bc | 4653.3 | a |
| 7 | Ethephon + Dietholate | 360 + 100 | 0.5 + 0.125 | 152.8 | c | 26.3 | bc | 48.8 | c | 5422.2 | a |
| 8 | Ethephon + Acybenzolar-S-methyl | 360 + 5 | 0.5 + 0.01 | 159.1 | c | 25.8 | c | 50.9 | cd | 5626.7 | a |
| | LSD (P = .05) | | | 7.45 | | 1.28 | | 1.64 | | 923.79 | |
| | CV | | | 2.8 | | 3.3 | | 2.15 | | 12.93 | |

* Averages followed by the same letter in the column do not differ by Duncan's test at 5% probability.

TABLE 2

Corn yield in function of the treatments.
Nova Mutum - Mato Grosso state - Brazil.

| | Treatment | Dose g ha⁻¹ a.i. | Dose CP L ha⁻¹ | Population of corn plants 60,000 plants/ha kg/corn plant | Population of corn plants 100,000 plants/ha kg/corn plant | Yield estimates 100,000 plants/ha kg/ha | Increased Yield (%) |
|---|---|---|---|---|---|---|---|
| 1 | Control | | | 0.085 | | | |
| 2 | Ethephon | 216 | 0.3 | 0.072 | 0.072 | 7226.0 | 42.4 |
| 3 | Ethephon | 360 | 0.5 | 0.071 | 0.071 | 7088.8 | 39.7 |
| 4 | Ethephon | 576 | 0.8 | 0.078 | 0.078 | 7800.0 | 53.7 |
| 5 | Acybenzolar-S-methyl | 5 | 0.8 | 0.080 | | | |
| 6 | Dietholate | 100 | 0.125 | 0.078 | | | |
| 7 | Ethephon + Dietholate | 360 + 100 | 0.5 + 0.125 | 0.090 | 0.090 | 9037.0 | 78.0 |
| 8 | Ethephon + Acybenzolar-S-methyl | 360 + 5 | 0.5 + 0.01 | 0.094 | 0.094 | 9377.8 | 84.8 |

Example 2—Effect of Growth Regulator Ethephon Applied to Corn at the Stage of Development V6

In the moment of the application, the insecticide chlorantraniliprole (25 g ha⁻¹ a.i.) and the fungicide cyproconazole+azoxystrobin (24+60 g ha⁻¹ a.i.) were added in all treatments, including the control.

The application of ethephon to corn at the stage of development V6 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.4 cm while the treatments with the application of ethephon had shoot length less than or equal to 152.5 cm (Table 3).

The application of ethephon reduces the length and diameter of ears of corn and the yield reduction was significant for some treatments, and the yield increase was also significant for some treatments with ethephon (Table 3). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of ethephon would provide yield increases of more than 10.1% when compared to the control without application at the normal density of sowing (Table 4).

TABLE 3

Average results in shoot length (height), ear length and diameter and corn yield in function of the treatments.
Nova Mutum - Mato Grosso state - Brazil.

| | Treatment | Dose g ha⁻¹ a.i. | Dose CP L ha⁻¹ | 30 DAA Height (cm) | | 30 DAA Ear Length (cm) | | 30 DAA Ear Diameter (mm) | | Yield kg/ha | |
|---|---|---|---|---|---|---|---|---|---|---|---|
| 1 | Control | | | 223.4 | a | 23.9 | a | 38.2 | ab | 2886.7 | ab |
| 2 | Ethephon | 216 | 0.3 | 144.3 | e | 21.4 | cd | 37.9 | ab | 1906.7 | c |
| 3 | Ethephon | 360 | 0.5 | 148.5 | de | 21.1 | d | 36.7 | bc | 3553.3 | a |
| 4 | Ethephon | 576 | 0.8 | 144.9 | e | 23.3 | ab | 37.7 | ab | 3540.0 | a |
| 5 | Acybenzolar-S-methyl | 5 | 0.01 | 195.2 | c | 21.9 | cd | 34.7 | c | 2662.2 | b |
| 6 | Dietholate | 100 | 0.125 | 207.3 | b | 22.8 | abc | 40.2 | a | 2968.9 | ab |
| 7 | Ethephon + Dietholate | 360 + 100 | 0.5 + 0.125 | 145.8 | e | 22.4 | bc | 34.0 | c | 1957.8 | c |
| 8 | Ethephon + Acybenzolar-S-methyl | 360 + 5 | 0.5 + 0.01 | 152.5 | d | 22.5 | bc | 38.3 | ab | 2784.5 | ab |
| | LSD (P = .05) | | | 5.69 | | 1.22 | | 2.74 | | 697.85 | |
| | CV | | | 2.27 | | 3.71 | | 5.01 | | 17.05 | |

* Averages followed by the same letter in the column do not differ by Duncan's test at 5% probability.

TABLE 4

Corn yield in function of the treatments.
Nova Mutum - Mato Grosso state - Brazil.

| | Treatment | Dose | | Population of corn plants | | Yield estimates | Increased Yield |
|---|---|---|---|---|---|---|---|
| | | g ha$^{-1}$ a.i. | CP L ha$^{-1}$ | 60,000 plants/ha kg/corn plant | 100,000 plants/ha kg/corn plant | 100,000 plants/ha kg/ha | (%) |
| 1 | Control | | | 0.048 | | | |
| 2 | Ethephon | 216 | 0.3 | 0.032 | 0.032 | 3177.8 | 10.1 |
| 3 | Ethephon | 360 | 0.5 | 0.059 | 0.059 | 5922.2 | 105.2 |
| 4 | Ethephon | 576 | 0.8 | 0.059 | 0.059 | 5900.0 | 104.4 |
| 5 | Acybenzolar-S-methyl | 5 | 0.8 | 0.044 | | | |
| 6 | Dietholate | 100 | 0.125 | 0.049 | | | |
| 7 | Ethephon + Dietholate | 360 + 100 | 0.5 + 0.125 | 0.033 | 0.033 | 3263.0 | 13.0 |
| 8 | Ethephon + Acybenzolar-S-methyl | 360 + 5 | 0.5 + 0.01 | 0.046 | 0.046 | 4640.8 | 60.8 |

Example 3—Effect of Growth Regulator Ethephon+Cyclanilide Applied to Corn at the Stage of Development V8

In the moment of the application, the insecticide methomyl (215 g ha$^{-1}$ a.i.) and the fungicide pyraclostrobin+epoxyconazole (99.75+37.5 g ha$^{-1}$ a.i.) were added in all treatments, including the control.

The application of ethephon+cyclanilide to corn at the stage of development V8 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.6 cm while the treatments with the application of ethephon+cyclanilide had shoot length less than or equal to 156.7 cm (Table 5).

The application of ethephon+cyclanilide reduces the length and diameter of ears of corn and the yield reduction was not significant (Table 5). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of ethephon would provide yield increases of more than 44.4% when compared to the control without application at the normal density of sowing (Table 6).

TABLE 5

Average results in shoot length (height), ear length and
diameter and corn yield in function of the treatments.
Nova Mutum - Mato Grosso state - Brazil.

| | Treatment | Dose | | 30 DAA | | | | | | | |
|---|---|---|---|---|---|---|---|---|---|---|---|
| | | g ha$^{-1}$ a.i. | CP L ha$^{-1}$ | Height (cm) | | Ear Length (cm) | | Ear Diameter (mm) | | Yield kg/ha | |
| 1 | Control | | | 233.6 | a | 27.9 | a | z,899;4.6 | a | 5075.6 | bc |
| 2 | Cyclanilide + Ethephon | 27 + 216 | 0.45 | 156.7 | b | 23.8 | c | z,899;0.8 | c | 4777.8 | c |
| 3 | Cyclanilide + Ethephon | 45 + 360 | 0.75 | 153.3 | b | 24.0 | c | 53.1 | ab | 4397.8 | c |
| 4 | Cyclanilide + Ethephon | 72 + 576 | 1.2 | 155.0 | b | 24.7 | c | 52.6 | abc | 4884.4 | c |
| 5 | Cyclanilide + Ethephon + Ethephon | 22.5 + 180 + 180 | 0.375 + 0.75 | 155.8 | b | 26.3 | b | 53.0 | ab | 5884.4 | ab |
| 6 | Cyclanilide + Ethephon + Ethephon + Acybenzolar-S-methyl | 22.5 + 180 + 180 + 5 | 0.375 + 0.75 + 0.01 | 148.3 | c | 25.3 | bc | 51.2 | bc | 4973.3 | c |
| 7 | Cyclanilide + Ethephon + Dietholate | 45 + 360 + 100 | 0.75 + 0.125 | 147.2 | c | 24.9 | bc | 52.4 | bc | 6520.0 | a |
| | LSD (P = .05) | | | 3.38 | | 1.34 | | 1.93 | | 849.57 | |
| | CV | | | 1.39 | | 3.56 | | 2.47 | | 10.96 | |

* Averages followed by the same letter in the column do not differ by Duncan's test at 5% probability.

TABLE 6

Corn yield in function of the treatments.
Nova Mutum - Mato Grosso state - Brazil.

| | Treatment | Dose g ha$^{-1}$ a.i. | Dose CP L ha$^{-1}$ | Population of corn plants 60,000 plants/ha kg/corn plant | Population of corn plants 100,000 plants/ha kg/corn plant | Yield estimates 100,000 plants/ha kg/ha | Increased Yield (%) |
|---|---|---|---|---|---|---|---|
| 1 | Control | | | 0.085 | | | |
| 2 | Cyclanilide + Ethephon | 27 + 216 | 0.45 | 0.080 | 0.080 | 7963.0 | 56.9 |
| 3 | Cyclanilide + Ethephon | 45 + 360 | 0.75 | 0.073 | 0.073 | 7329.7 | 44.4 |
| 4 | Cyclanilide + Ethephon | 72 + 576 | 1.2 | 0.081 | 0.081 | 8140.7 | 60.4 |
| 5 | Cyclanilide + Ethephon + Ethephon | 22.5 + 180 + 180 | 0.375 + 0.75 | 0.098 | 0.098 | 9807.3 | 93.2 |
| 6 | Cyclanilide + Ethephon + Ethephon + Acybenzolar-S-methyl | 22.5 + 180 + 180 + 5 | 0.375 + 0.75 + 0.01 | 0.083 | 0.083 | 8288.8 | 63.3 |
| 7 | Cyclanilide + Ethephon + Dietholate | 45 + 360 + 100 | 0.75 + 0.125 | 0.109 | 0.109 | 10866.7 | 114.1 |

Example 4—Effect of Growth Regulator Ethephon+Cyclanilide Applied to Corn at the Stage of Development V6

In the moment of the application, the insecticide chlorantraniliprole (25 g ha$^{-1}$ a.i.) and the fungicide cyproconazole+azoxystrobin (24+60 g ha$^{-1}$ a.i.) were added in all treatments, including the control.

The application of ethephon+cyclanilide to corn at the stage of development V6 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.4 cm while the treatments with the application of ethephon+cyclanilide had shoot length less than or equal to 151.0 cm (Table 7).

The application of ethephon+cyclanilide reduces the length and diameter of ears of corn and the yield reduction was not significant for the treatments with ethephon+cyclanilide (Table 7). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of ethephon+cyclanilide would provide yield increases of more than 36.1% when compared to control without application at the normal density of sowing (Table 8).

TABLE 7

Average results in shoot length (height), ear length and diameter and corn yield in function of the treatments.
Nova Mutum - Mato Grosso state - Brazil.

| | Treatment | Dose g ha$^{-1}$ a.i. | Dose CP L ha$^{-1}$ | 30 DAA Height (cm) | | 30 DAA Ear Length (cm) | | 30 DAA Ear Diameter (mm) | | Yield kg/ha | |
|---|---|---|---|---|---|---|---|---|---|---|---|
| 1 | Control | | | 223.4 | a | 23.9 | a | 38.2 | a | 2886.7 | a |
| 2 | Cyclanilide + Ethephon | 27 + 216 | 0.45 | 151.0 | b | 22.1 | bc | 37.5 | ab | 2837.8 | a |
| 3 | Cyclanilide + Ethephon | 45 + 360 | 0.75 | 145.0 | c | 22.4 | b | 34.1 | bc | 2357.8 | a |
| 4 | Cyclanilide + Ethephon | 72 + 576 | 1.2 | 126.3 | f | 21.8 | bcd | 38.8 | a | 2862.2 | a |
| 5 | Cyclanilide + Ethephon + Ethephon | 22.5 + 180 + 180 | 0.375 + 0.75 | 132.7 | e | 20.6 | d | 32.7 | c | 1257.8 | b |
| 6 | Cyclanilide + Ethephon + Ethephon + Acybenzolar-S-methyl | 22.5 + 180 + 180 + 5 | 0.375 + 0.75 + 0.01 | 140.9 | d | 21.8 | bcd | 37.0 | ab | 2933.3 | a |
| 7 | Cyclanilide + Ethephon + Dietholate | 45 + 360 + 100 | 0.75 + 0.125 | 132.7 | e | 21.1 | cd | 37.4 | ab | 2713.3 | a |
| | LSD (P = .05) | | | 3.5 | | 1.17 | | 3.42 | | 784.18 | |
| | CV | | | 1.57 | | 3.59 | | 6.31 | | 20.7 | |

* Averages followed by the same letter in the column do not differ by Duncan's test at 5% probability.

TABLE 8

Corn yield in function of the treatments.
Nova Mutum - Mato Grosso state - Brazil.

| | | Dose | | Population of corn plants | | Yield estimates | Increased Yield |
|---|---|---|---|---|---|---|---|
| | Treatment | g ha$^{-1}$ a.i. | CP L ha$^{-1}$ | 60,000 plants/ha kg/corn plant | 100,000 plants/ha kg/corn plant | 100,000 plants/ha kg/ha | (%) |
| 1 | Control | | | 0.048 | | | |
| 2 | Cyclanilide + Ethephon | 27 + 216 | 0.45 | 0.047 | 0.047 | 4729.7 | 63.8 |
| 3 | Cyclanilide + Ethephon | 45 + 360 | 0.75 | 0.039 | 0.039 | 3929.7 | 36.1 |
| 4 | Cyclanilide + Ethephon | 72 + 576 | 1.2 | 0.048 | 0.048 | 4770.3 | 65.3 |
| 5 | Cyclanilide + Ethephon + Ethephon | 22.5 + 180 + 180 | 0.375 + 0.75 | 0.021 | 0.021 | 2096.3 | −27.4 |
| 6 | Cyclanilide + Ethephon + Ethephon + Acybenzolar-S-methyl | 22.5 + 180 + 180 + 5 | 0.375 + 0.75 + 0.01 | 0.049 | 0.049 | 4888.8 | 69.4 |
| 7 | Cyclanilide + Ethephon + Dietholate | 45 + 360 + 100 | 0.75 + 0.125 | 0.045 | 0.045 | 4522.2 | 56.7 |

Example 5—Effect of Growth Regulator BF 428-5 Applied to Corn at the Stage of Development V8

In the moment of the application, the insecticide methomyl (215 g ha$^{-1}$ a.i.) and the fungicide pyraclostrobin+epoxyconazole (99.75+37.5 g ha$^{-1}$ a.i.) were added in all treatments, including the control.

The application of BF 428-5 (chlormequat chloride) to corn at the stage of development V8 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.6 cm while the treatments with the application of BF 428-5 had shoot length less than or equal to 218.8 cm (Table 9).

The application of BF 428-5 does not reduce the length and diameter of ears of corn and there is no yield reduction (Table 9). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of BF 428-5 would provide yield increases of more than 43% when compared to control without application at the normal density of sowing (Table 10).

TABLE 9

Average results in shoot length (height), ear length and diameter and corn yield in function of the treatments.
Nova Mutum - Mato Grosso state - Brazil.

| | | Dose | | 30 DAA | | | | | | | |
|---|---|---|---|---|---|---|---|---|---|---|---|
| | | | | Height | | Ear Length | | Ear Diameter | | Yield | |
| | Treatment | g ha$^{-1}$ a.i. | CP L ha$^{-1}$ | (cm) | | (cm) | | (mm) | | kg/ha | |
| 1 | Control | | | 233.6 | a | 27.9 | a | 54.6 | a | 5075.6 | ab |
| 2 | BF 428-05 | 42.5 | 0.1 | 214.6 | b | 27.8 | a | 54.3 | a | 5762.2 | a |
| 3 | BF 428-05 | 85 | 0.2 | 218.8 | b | 27.3 | a | 53.9 | a | 4355.6 | b |
| 4 | BF 428-05 | 127.5 | 0.3 | 217.8 | b | 27.2 | a | 54.2 | a | 4968.9 | ab |
| LSD (P = .05) | | | | 8.1 | | 1.12 | | 1.26 | | 849.04 | |
| CV | | | | 2.29 | | 2.54 | | 1.46 | | 10.53 | |

\* Averages followed by the same letter in the column do not differ by Duncan's test at 5% probability.

TABLE 10

Corn yield in function of the treatments.
Nova Mutum - Mato Grosso state - Brazil.

| | | Dose | | Population of corn plants | | Yield estimates | Increased Yield |
|---|---|---|---|---|---|---|---|
| | Treatment | g ha$^{-1}$ a.i. | CP L ha$^{-1}$ | 60,000 plants/ha kg/corn plant | 100,000 plants/ha kg/corn plant | 100,000 plants/ha kg/ha | (%) |
| 1 | BF Control | | | 0.085 | | | |
| 2 | BF 428-05 | 42.5 | 0.1 | 0.096 | 0.096 | 9603.7 | 89.2 |

TABLE 10-continued

Corn yield in function of the treatments.
Nova Mutum - Mato Grosso state - Brazil.

| | | Dose | | Population of corn plants | | Yield estimates | Increased |
|---|---|---|---|---|---|---|---|
| | | | | 60,000 plants/ha | 100,000 plants/ha | 100,000 plants/ha | Yield |
| | Treatment | g ha$^{-1}$ a.i. | CP L ha$^{-1}$ | kg/corn plant | kg/corn plant | kg/ha | (%) |
| 3 | BF 428-05 | 85 | 0.2 | 0.073 | 0.073 | 7259.3 | 43.0 |
| 4 | BF 428-05 | 127.5 | 0.3 | 0.083 | 0.083 | 8281.5 | 63.2 |

Example 6—Effect of Growth Regulator BF 428-5 Applied to Corn at the Stage of Development V6

In the moment of the application, the insecticide chlorantraniliprole (25 g ha$^{-1}$ a.i.) and the fungicide cyproconazole+azoxystrobin (24+60 g ha$^{-1}$ a.i.) were added in all treatments, including the control.

The application of BF 428-5 (chlormequat chloride) to corn at the stage of development V6 caused a reduction in shoot length, increased formation of adventitious roots, strengthening of the stem, strengthening of the root system, increased ventilation in the culture, proper development of male and female inflorescences.

The reduction in shoot length is significant and it was observed a week after application. At 30 days after application (DAA), the control had 233.4 cm while the treatments with the application of ethephon had shoot length less than or equal to 206.0 cm (Table 11).

The application of BF 428-5 does not reduce the length and diameter of ears of corn and there is no yield reduction (Table 11). However, it provides the necessary conditions for the enhancement of corn plant density per hectare, without etiolation, excessive lengthening of the internodes of the stem and lodging of corn plants.

In the estimation of the corn crop yield with a planting density of 100,000 plants per hectare, the application of BF 428-5 would provide yield increases of more than 9.8% when compared to the control without application at the normal density of sowing (Table 12).

TABLE 11

Average results in shoot length (height), ear length and diameter and corn yield in function of the treatments.
Nova Mutum - Mato Grosso state - Brazil.

| | | Dose | | 30 DAA | | | | | | | |
|---|---|---|---|---|---|---|---|---|---|---|---|
| | | | | Height | | Ear Length | | Ear Diameter | | Yield | |
| | Treatment | g ha$^{-1}$ a.i. | CP L ha$^{-1}$ | (cm) | | (cm) | | (mm) | | kg/ha | |
| 1 | Control | | | 223.4 | a | 23.9 | a | 38.2 | a | 2886.7 | a |
| 2 | BF 428-05 | 42.5 | 0.1 | 206.0 | b | 23.9 | a | 38.4 | a | 3126.7 | a |
| 3 | BF 428-05 | 85 | 0.2 | 205.8 | b | 22.9 | b | 37.0 | a | 1902.2 | a |
| 4 | BF 428-05 | 127.5 | 0.3 | 200.3 | b | 21.5 | c | 37.9 | a | 2500.0 | a |
| | LSD (P = .05) | | | 6.69 | | 0.63 | | 2.73 | | 1111.44 | |
| | CV | | | 2 | | 1.71 | | 4.5 | | 26.69 | |

* Averages followed by the same letter in the column do not differ by Duncan's test at 5% probability.

TABLE 12

Corn yield in function of the treatments.
Nova Mutum - Mato Grosso state - Brazil.

| | | Dose | | Population of corn plants | | Yield estimates | Increased |
|---|---|---|---|---|---|---|---|
| | | | | 60,000 plants/ha | 100,000 plants/ha | 100,000 plants/ha | Yield |
| | Treatment | g ha$^{-1}$ a.i. | CP L ha$^{-1}$ | kg/corn plant | kg/corn plant | kg/ha | (%) |
| 1 | Control | | | 0.048 | | | |
| 2 | BF 428-05 | 42.5 | 0.1 | 0.052 | 0.052 | 5211.2 | 80.5 |
| 3 | BF 428-05 | 85 | 0.2 | 0.032 | 0.032 | 3170.3 | 9.8 |
| 4 | BF 428-05 | 127.5 | 0.3 | 0.042 | 0.042 | 4166.7 | 44.3 |

All the changes induced by the growth regulator in the corn plant provided suitable conditions for obtaining high crop yield, which clearly shows the completely new and unexpected effect of the present invention compared to the prior art.

With the present invention, the corn crop yield is ensured, as well as the control of pests and diseases that affect the crops.

The invention claimed is:

1. A method for improving yield in corn crops planted in densities of greater than 100,000 plants per hectare by reducing excessive growth of corn plants, comprising the steps: (a) planting a corn crop at a seeding density higher than 100,000 corn plants per hectare; and during late vegetative stages from V6 to V9 of the corn crop, (b) applying to the corn and/or its progeny in said late vegetative stages an agronomically effective amount of a composition consisting essentially of: (i) a plant growth regulator and a fungicide; or (ii) a plant growth regulator and an insecticide; or (iii) a plant growth regulator and an acaricide; or (iv) a plant growth regulator and a fungicide and an insecticide; or (v) a plant growth regulator and an insecticide and an acaricide; or (vi) a plant growth regulator and a fungicide and an acaricide.

2. The method of claim 1 wherein said plant growth regulator is one selected from the group consisting of: ethephon, mepiquat chloride, Ca-prohexadione, ancymidol, flurprimidol, chlormequat, dikegulac sodium, mefluidide, uniconazole, paclobutazole, 1-naphthaleneacetic acid, 1-naphthalene acetamide, carbaryl, 6-benzyladenine, etichlozate, sulphocarbamide, ethylene, gibberellic acid, $GA_{4+7}$, choline chloride, cyanamide, cynetine, and acybenzolar-S-methyl.

3. The method of claim 2 wherein said plant growth regulator is selected from the group consisting of ethephon, chlormequat, and acybenzolar-S-methyl.

4. The method of claim 1 wherein the plant growth regulator is applied in an amount of from 1 to 1,000 grams of plant growth regulator per hectare.

5. The method of claim 4 wherein the plant growth regulator is applied in an amount of from 2.5 to 500 grams of plant growth regulator per hectare.

6. The method of claim 1 wherein the plant growth regulator is ethephon, and is applied in an amount between 216 and 576 grams of plant growth regulator per hectare.

7. The method of claim 1 wherein the plant growth regulator is chlormequat, and is applied in an amount between 42.5 and 127.5 grams of plant growth regulator per hectare.

* * * * *